United States Patent
Yang et al.

(10) Patent No.: US 7,465,500 B2
(45) Date of Patent: Dec. 16, 2008

(54) LIGHTWEIGHT PROTECTOR AGAINST MICROMETEOROIDS AND ORBITAL DEBRIS (MMOD) IMPACT USING FOAM SUBSTANCES

(75) Inventors: Sherwin Yang, Chatsworth, CA (US); Nathan J. Hoffman, West Hills, CA (US); Adon Delgado, Jr., West Hills, CA (US); Alan V. Von Arx, Northridge, CA (US); Michael P. Moriarty, Simi Valley, CA (US); Kathleen M. Sevener, Los Angeles, CA (US); Gerard D. Pelletier, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 415 days.

(21) Appl. No.: 10/977,188

(22) Filed: Oct. 28, 2004

(65) Prior Publication Data

US 2006/0090636 A1  May 4, 2006

(51) Int. Cl.
*F41H 5/04* (2006.01)
*F41H 5/00* (2006.01)

(52) U.S. Cl. .................. 428/550; 2/2.5; 89/36.01; 89/36.02; 109/49.5; 428/911; 428/547; 428/304.4; 428/307.7; 428/613

(58) Field of Classification Search ............ 428/911, 428/547, 550, 304.4, 307.7; 2/2.5; 89/36.01, 89/36.02; 109/49.5
See application file for complete search history.

(56) References Cited

U.S. PATENT DOCUMENTS

| | | | | |
|---|---|---|---|---|
| 5,194,202 A * | 3/1993 | Yun et al. | .......... | 148/538 |
| 5,588,477 A * | 12/1996 | Sokol et al. | .......... | 164/34 |
| 6,895,851 B1 * | 5/2005 | Adams et al. | .......... | 89/36.02 |
| 7,026,045 B2 * | 4/2006 | Rettenbacher et al. | ... | 428/306.6 |
| 7,143,813 B2 | 12/2006 | Delgado, Jr. et al. | | |
| 2003/0194546 A1 * | 10/2003 | McCabe | .......... | 428/304.4 |
| 2006/0048640 A1 * | 3/2006 | Terry et al. | .......... | 89/36.02 |

FOREIGN PATENT DOCUMENTS

WO    WO 0055567 A1 * 9/2000

OTHER PUBLICATIONS

"Duocel Aluminum Foam in Energy Absorption" found at http://www.ergaerospace.com/literature/energy.htm provided with an effective date of Dec. 4, 2003 as noted by the Wayback Machine at http://webarchive.org.*

"Duocel Aluminum Foam" found at http://www.ergaerospace.com/duocel/aluminum.htm provided with an effective date of Dec. 2, 2003 as noted by the Wayback Machine at http://webarchive.org.*

* cited by examiner

*Primary Examiner*—John J. Zimmerman
*Assistant Examiner*—Aaron Austin
(74) *Attorney, Agent, or Firm*—Duke W. Yee; Kevin G. Fields; Theodore D. Fay, III

(57) ABSTRACT

Methods and apparatus are provided for a shield to protect a surface from the impact of hyper-velocity projectiles. The apparatus comprises a foam material that is configured to cover the surface to be protected and is attached directly to that surface. A coating material is typically disposed on the outer surface of the foam material and may penetrate the foam material to a predetermined depth. The foam material and the coating material are selected to form a composite having predetermined values of sonic velocity, toughness, and thermal conductivity. The composite of foam material and coating material can be significantly lighter in weight than a metal shield having equivalent protective characteristics.

1 Claim, 1 Drawing Sheet

LIGHTWEIGHT PROTECTOR AGAINST MICROMETEOROIDS AND ORBITAL DEBRIS (MMOD) IMPACT USING FOAM SUBSTANCES

TECHNICAL FIELD

The present invention generally relates to mechanical shield devices, and more particularly relates to lightweight protectors for spacecraft against micrometeoroids and orbital debris (MMOD).

BACKGROUND

One of the many design challenges in the field of spacecraft technology involves the protection of the spacecraft (e.g., communications satellites, space stations, etc.) from impact with micrometeoroids and orbital debris (MMOD). Typically, a spacecraft is likely to encounter numerous MMOD during a mission, and it has been projected by some scientists that orbital debris related to artificial objects is likely to increase by approximately 2 to 5 percent per year. The MMOD may approach a spacecraft at a hyper-velocity, e.g., in the range of approximately 10 to 20 km/sec. (as compared to the sonic velocity in air of approximately 0.3 km/sec.), and can cause serious damage to an unprotected spacecraft. Therefore, some type of protective shield against the threat of MMOD is generally implemented on the vulnerable areas of a spacecraft to protect it from this kind of damage.

Various types of mechanical shields (e.g., all-aluminum shields) have been developed to provide MMOD protection for a spacecraft. One type of shield commonly used for this purpose, generally known as the Whipple shield, consists basically of an outer aluminum wall and an inner aluminum wall enclosing a multi-layer material in a sandwich configuration. The multi-layer material is typically selected for thermal insulating and/or shock dispersion properties, and is generally fabricated from metal foils or ceramic fabrics. The outer wall of a Whipple shield is typically separated from the structure being protected by a standoff distance. This standoff distance is intended to defocus and spread the impact shock and impact debris over a relatively large area upon impacting the protected surface.

All-aluminum or Whipple types of protective shields, however, can impose a significant weight penalty on a protected structure, which is generally undesirable in a spacecraft application. In addition, the standoff distance of a Whipple shield typically becomes a vacuum space during a spacecraft mission, and when disposed on heat dissipation surfaces, can significantly lower the temperature on the outer surface of the shield. As the shield surface radiates at lower temperatures, the heat rejection efficiency of the protected heat dissipation surfaces of the spacecraft can be reduced substantially.

Accordingly, it is desirable to provide an MMOD protective device that is relatively lightweight in comparison to a typical all-aluminum or Whipple shield. In addition, it is desirable to provide an MMOD protective device that does not significantly compromise the heat dissipation capabilities of the protected structure. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices and methods are provided for protecting a surface from the impact of hyper-velocity projectiles such as MMOD. One embodiment comprises a foam material that is configured to cover the surface to be protected and is attached directly to that surface. A coating material is typically disposed on the outer surface of the foam material and may penetrate the foam material to a predetermined depth. The foam material may be metal, ceramic, organic, or a composite. The coating material is typically a metal such as copper, and may be applied to the foam material by plating, Chemical Vapor Deposition, or Physical Vapor Deposition. The foam material is typically attached to the surface being protected by brazing or adhesive bonding.

The foam material and the coating material can be selected and adjusted to form a composite having predetermined values of sonic velocity, toughness, and thermal conductivity. The exemplary composite of foam material and coating material can be significantly lighter in weight than conventional all-metal or Whipple types of shields having equivalent protective characteristics.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of protecting a device such as a spacecraft from the impact of MMOD. To overcome the disadvantages of conventional protective shields with respect to weight and heat dissipation, exemplary embodiments of protective shields are configured with lightweight foam materials such as metal, ceramic, or organic. The porous structure of the foam material can enable diffusion of an impact shock and debris, and the specific configuration of the foam shield can be tailored to optimize heat dissipation characteristics.

Figure 1:
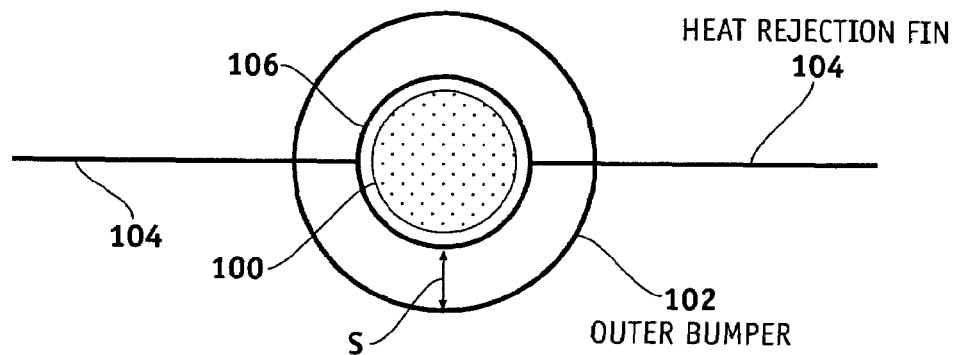
FIG. 1 is an illustration of a typical Whipple shield deployment on a spacecraft.

As noted in the Background, conventional multi-layer metal and ceramic fabric shields such as the Whipple shield have been widely used to protect vulnerable areas of a spacecraft from MMOD impacts. For example, a typical spacecraft component protected by a Whipple shield is illustrated in FIG. 1. In this example, a fluid tube 100 is configured with a Whipple shield outer bumper 102 and heat rejection fins 104. Typically, fluid tube 100 is also configured with a protective outer sleeve 106 that is separated from bumper 102 by a standoff distance S. In a typical spacecraft application, various types of pipes such as fluid tube 100 may be used to carry liquids or gases and may be vulnerable to MMOD damage, as described more fully below. As previously noted, a conventional Whipple shield such as bumper 102 is generally configured to absorb and defocus the shock and debris of an MMOD impact in order to protect the underlying component (fluid tube 100/106). However, a Whipple or other type of conventional metal shield can add significant weight to a spacecraft and may also degrade the heat rejection capabilities of the components being protected.

In the event of an MMOD impact, where a hyper-velocity projectile hits a protective shield, a shock event is typically developed at the point of contact. Since typical MMOD approach velocities can reach speeds greater than the speed of sound in most materials, a shock event is generally assured upon impact. For example, an MMOD impact speed may be as high as twenty (20) km/sec., whereas a typical sonic speed for aluminum is approximately 5 km/sec., and approximately 3.5 km/sec for copper. Upon impact, the difference of MMOD speed relative to the sonic velocity of the shield material typically leads to a shock wave formation. The shock wave typically propagates through the outer layer of the protective shield (e.g., a Whipple shield) and is reflected by the back surface of the protective shield. A strong reflection at the back surface can cause "spallation" (splattering) of the back surface that can impact and damage the underlying surface being protected. In addition, this initial shock phenomenon can damage the outer protective layer at the point of contact due to the intense heat generally developed in the materials involved (i.e., the projectile and the protective shield outer layer). In some cases, the heat at the point of contact can cause melting or evaporation of these materials, and is generally referred to as "ablation".

Following an initial shock event, the remaining projectile mass can continue to penetrate the outer protective layer of the shield as the protective layer absorbs the kinetic energy of the projectile. This absorption of kinetic energy may cause the protective layer to melt and/or evaporate to form an impact crater. This type of cratering event within the protective layer can cause damage to the underlying surface being protected, depending on the depth of the crater.

In order to overcome the weight disadvantage of a metal or a Whipple type of shield, an exemplary embodiment of a different type of protective shield can be fabricated from a porous foam medium (e.g., metal foam, ceramic foam, organic foam). With this type of protective shield material, an initial shock event as described above can be diffused in the foam structure (i.e., the foam ligaments defining the open pores of the foam structure). As such, the shock wave typically generated by an initial shock event can be significantly weakened as it reaches the back surface of a foam protective shield. That is, a protective foam material typically spreads the shock wave over time and space as the wave travels at the ligament material speed of sound and propagates and reflects along the various ligament paths. As a result, the diffused shock wave generally arrives at the surface to be protected at different times and phases. Appropriate selection of a foam material configuration can enable a foam protective shield to be customized for both mechanical and thermal properties in accordance with a particular application. Moreover, a typical foam shield configuration will generally provide a significant weight reduction as compared to a conventional aluminum or Whipple shield. In addition, the vacuum space typically created by the standoff distance of a Whipple shield is generally eliminated because a thermally conductive foam shield can be attached directly to the surface of the structure being protected.

Figure 2:
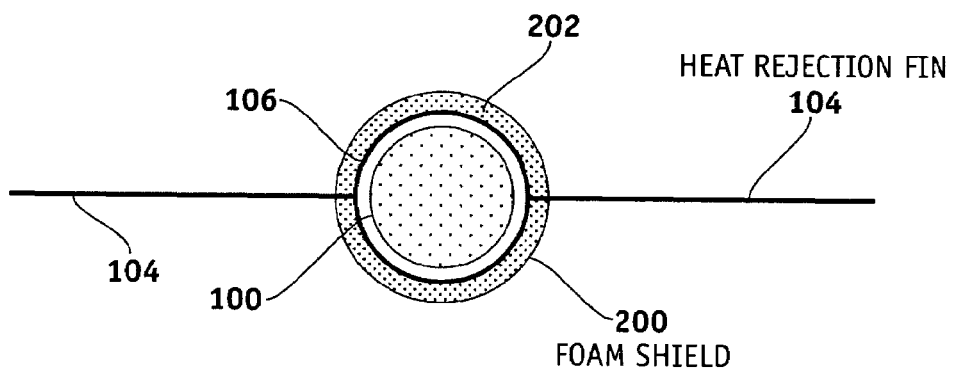
FIG. 2 is an illustration of an exemplary embodiment of a foam shield deployed on a spacecraft.

According to an exemplary embodiment of a lightweight thermally conductive foam protective shield 200, as shown in FIG. 2, a conductive foam material 202 having an open pore structure is configured to protect a fluid tube 100 in a spacecraft (not shown) or similar object subject to impact with hyper-velocity projectiles. In this exemplary embodiment, foam shield 200 is attached directly to outer sleeve 106 of fluid tube 100. The open pore structure of foam material 202 typically provides a similar function to that of standoff distance S (FIG. 1), thereby enabling spallation/splatter from a shock event to be defocused. The porosity of foam material 202 generally ensures a low bulk density and a resultant lightweight protector. Moreover, the thermal conductivity of foam material 202 can be selected to provide adequate heat rejection from a protected component (e.g., fluid tube 100) without the previously described vacuum space insulating effect of standoff distance S.

Various basic foam materials are commercially available, such as copper and aluminum foams from ERG Materials and Aerospace Corporation in Oakland, Calif., and carbon foams from POCO Graphite Corporation in Decatur, Tex. While it may be feasible to use a basic foam material as a protective shield, the characteristics of a basic foam material can be improved for MMOD protection by coating the foam. That is, a foam-metal composite can be fabricated to adjust sonic velocity, toughness, and heat dissipation characteristics. For example, an exemplary embodiment of a foam shield can be implemented in a composite form by coating the basic foam material (e.g., aluminum foam or carbon foam) with a metal layer such as copper. The coating can be applied by conventional plating methods, or by Chemical Vapor Deposition (CVD) or Physical Vapor Deposition (PVD), or by any other suitable process. As such, the coated foam material can be customized to provide optimal sonic, toughness, and thermal characteristics for a specific application. Alternately, a metal foil can be bonded to the foam surfaces or sandwiched between foam layers. Also, different types of foam materials can be stacked and bonded as composite laminate foams.

Figure 3:
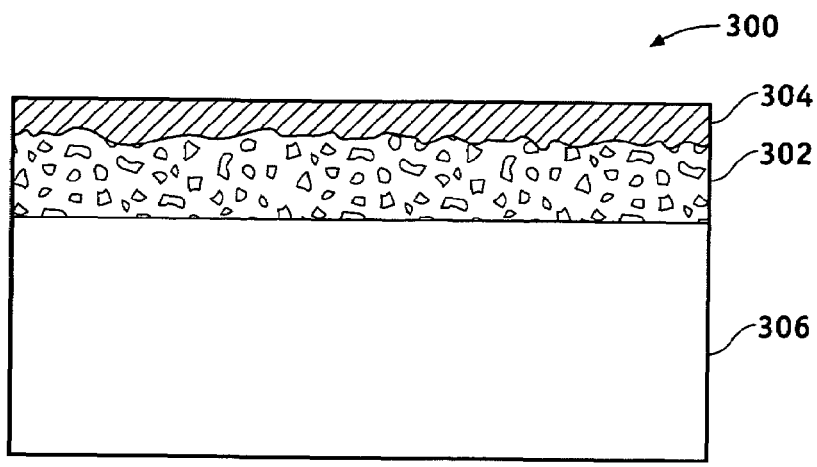
FIG. 3 is an illustration of an exemplary embodiment of a foam shield with metal plating.

An exemplary embodiment of a coated foam shield 300 is illustrated in FIG. 3. In this embodiment, a basic foam material 302 such as aluminum is configured with a layer of copper 304 to form shield 300. The composite foam shield 300 is shown attached to a spacecraft component 306 to be protected. To fabricate exemplary shield 300, the basic aluminum foam is first machined to conform to a desired shape. The shaped foam is then coated (with copper in this example) by any suitable technique such as plating, CVD, or PVD. The coated foam is then attached to the component to be protected by brazing, adhesive bonding, or any other suitable adhesion technique.

Test results have indicated that an aluminum foam with approximately 5% density and about 40 pores per inch (PPI) spacing can provide an effective basic material for a protective shield. This exemplary basic foam material can then be optimized for a particular application (such as MMOD protection) by coating the outer surface with a copper layer that penetrates the surface to a depth of approximately 0.3 cm. As noted previously, the type of foam material and the coating process can be selected and adjusted for different types of applications. In general, CVD can be used to infiltrate the coating throughout the foam material, while PVD can be used to limit the coating to the outer surface. Moreover, direct foil bonding may also be used.

Test results have further indicated that a composite foam shield can achieve MMOD protection equivalent to that of a conventional Whipple shield where the foam shield has an areal density (bulk density multiplied by the thickness) of approximately $1/40^{th}$ of a conventional Whipple shield. As such, a composite foam shield can offer a significant benefit in weight reduction as compared to conventional shields. Moreover, as noted previously, a foam shield typically eliminates the standoff distance vacuum space of a bumper-type shield, thereby improving the heat rejection efficiency of protected heat radiating surfaces of the spacecraft. Alternately, where it is desirable to thermally insulate a protected surface, a thermally insulating foam, such as a ceramic foam derived from e.g., silica or alumina, can be used. It will be appreciated that different combinations of foam materials can be configured to customize the foam shield thermal conductivity for a particular application.

Accordingly, the shortcomings of the prior art have been overcome by providing an improved MMOD shield for spacecraft protection. An exemplary embodiment of a lightweight, thermally controllable shield is typically configured with a foam material having a metal coating. The foam material and the metal coating can be selected to adjust the sonic velocity, toughness, and thermal conductivity of the composite for varying applications. The exemplary coated foam shield can provide adequate protection from MMOD impacts at a significantly lower weight and with controlled thermal conductivity as compared to a conventional shield.

The use of a ductile metal surface (deposit or foil) can be particularly advantageous when a brittle type of ceramic foam is used. The ductile outer metal layer can serve to contain the foam debris (fragments) that can result from an MMOD impact. This debris containment capability of an outer metal layer can not only inhibit high velocity debris from causing additional damage via secondary impacts, but can also serve to reduce the proliferation of space debris that might endanger other present and future space vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A shield for protecting a surface from the impact of hyper-velocity projectiles, comprising:
   an aluminum foam having a bulk density of approximately 5% and a porosity of approximately 40 pores per inch, and configured to cover the surface;
   a copper coating disposed on the outer surface of the aluminum foam and penetrating the aluminum foam to an approximate depth of 0.3 cm from the surface to form a composite, wherein the composite is attached directly to the surface to be protected by brazing.

* * * * *